Jan. 20. 1925.  1,523,906
A. A. SCHOENEGG
RICE SEPARATOR
Filed July 30, 1923   2 Sheets-Sheet 2
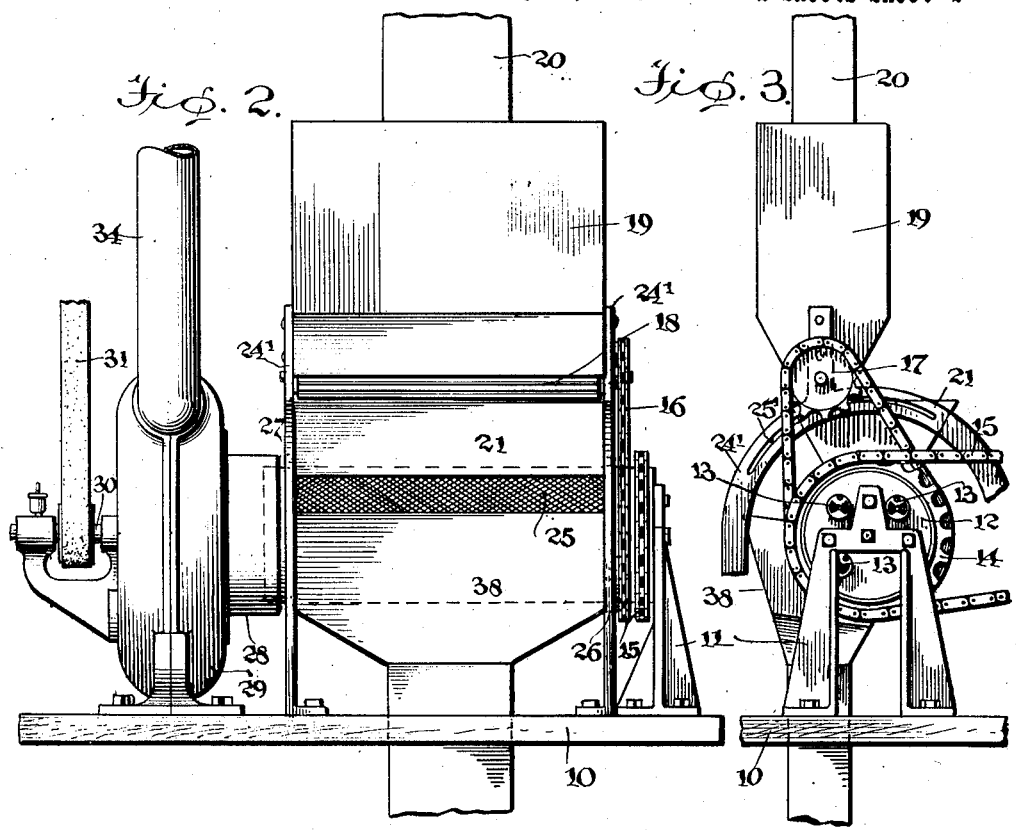
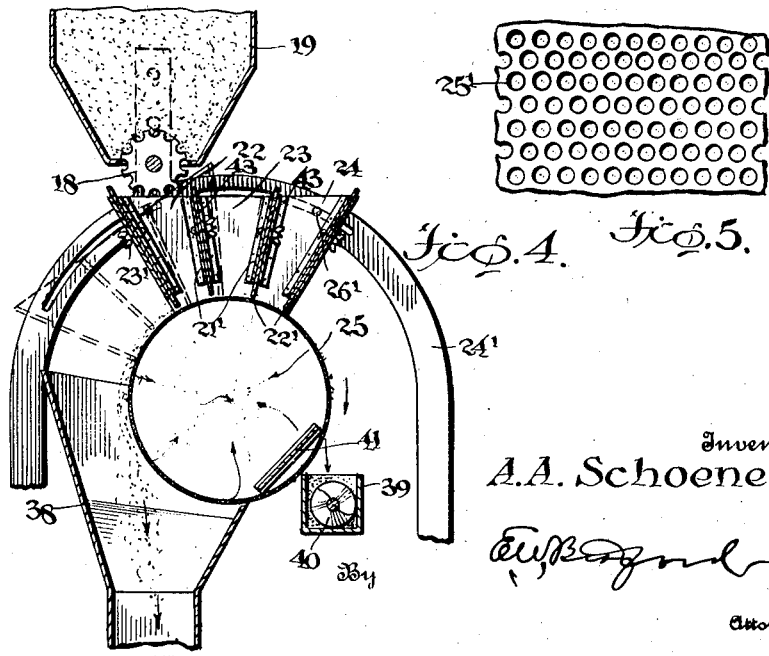
Inventor
A.A. Schoenegg,
Attorney Patented Jan. 20, 1925.

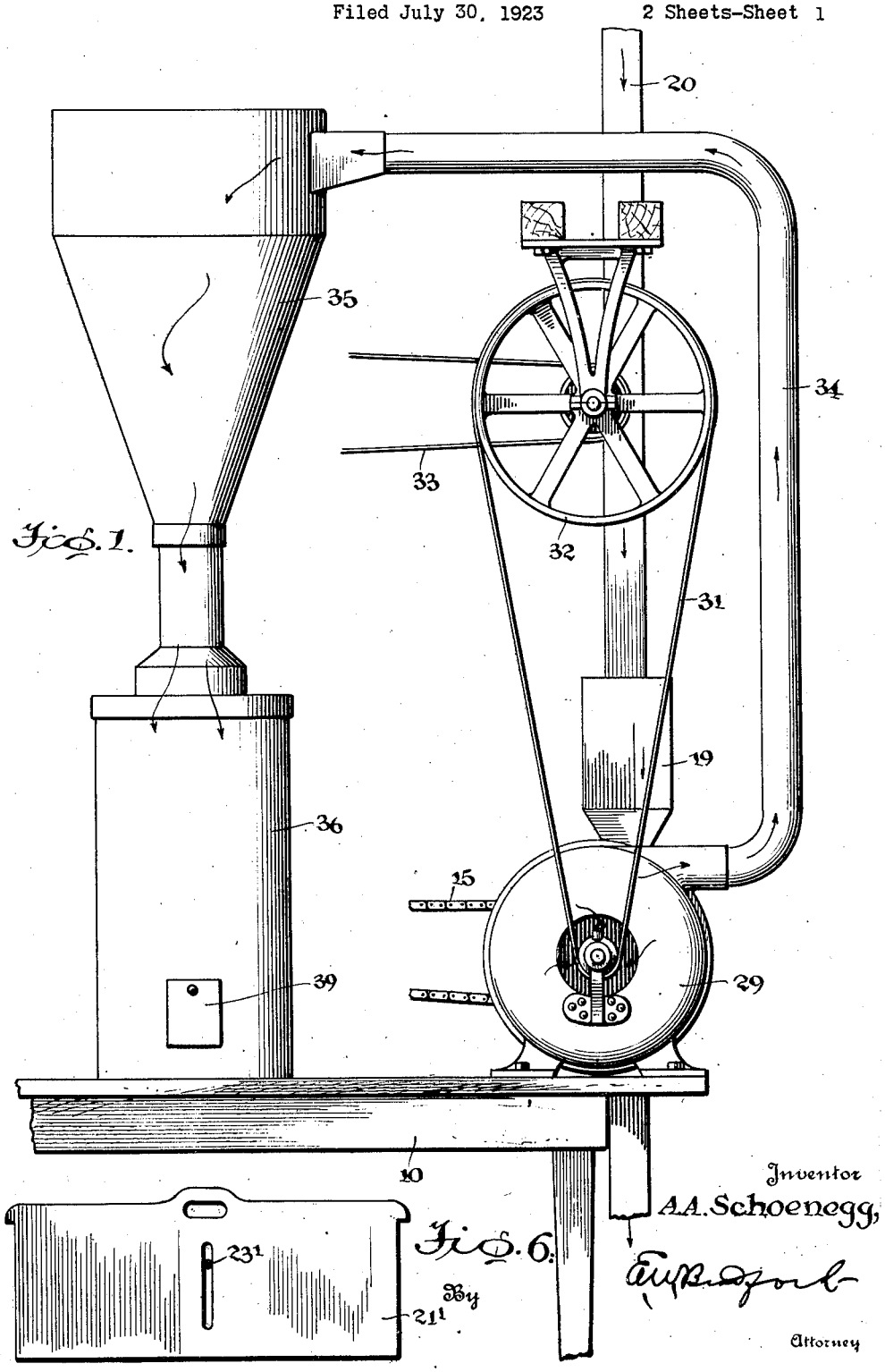

1,523,906

UNITED STATES PATENT OFFICE.

ANTON A. SCHOENEGG, OF SAN FRANCISCO, CALIFORNIA.

RICE SEPARATOR.

Application filed July 30, 1923. Serial No. 654,732.

*To all whom it may concern:*

Be it known that I, ANTON A. SCHOENEGG, a citizen of the United States, residing at San Francisco, in the county of San Francisco and State of California, have invented certain new and useful Improvements in Rice Separators, of which the following is a specification.

My said invention relates to a rice separator intended primarily for removing the water grass seed from California paddy rice. It is an object of my invention to provide a simple and effective device of this character which shall act preferably by pneumatic suction to thoroughly separate the clean rice from water grass seed and also to separate therefrom large seeds or such seeds as have beards, or are bunched together, so that the resulting product shall consist entirely of clean rice.

Another object of the invention is to provide adjustable feeding mechanism for varying the nature of the feed according to the foulness of the seed being treated.

Another object of the invention is to collect the waste matters removed from the seed so as to facilitate their disposal.

Referring to the accompanying drawings, which are made a part hereof and on which similar reference characters indicate similar parts, Figure 1 is a side elevation of my device, Figure 2, an end elevation, Figure 3, an elevation of part of the side opposite to that shown in Figure 1, Figure 4, a fragmentary section at right angles to Figure 2, Figure 5, a fragment of the perforated metal screen on an enlarged scale, and Figure 6, a face view of one of the slides in the hopper.

In the drawings reference character 10 indicates a table or other support adapted to carry the machine. The table has a vertical bracket 11 fixed thereto and a flat head 12 is bolted to the bracket said head having air passages, the size of which may be regulated by means of slides 13. A sprocket 14 is journaled on the head 12 and is driven by a sprocket chain 15 from any suitable source of power. A second sprocket integral with or fast to the first drives a chain 16 passing over a sprocket 17 fixed to the shaft of a fluted roll 18 and serves to drive the same. This roll is mounted in the open lower end of a bin 19 by means of which rice or other grain to be cleaned is supplied to the machine through a spout 20.

Beneath the feed roll is a hopper 21 provided with a series of compartments indicated at 22, 23, and 24. Cross-pieces 21' extend from end to end of the hopper and are secured thereto at their ends by rivets extending through said flanges and the end walls of the hopper. Said cross-pieces form guides for slidable partitions 22' between the compartments of the hopper and at the sides thereof by which the flow of grain may be varied and are spaced from the drum so as not to interfere with the feed. Bolts 23' are located in openings of the guides and project through slots (Fig. 6) in the partitions whereby the bolts can force the guides against the slidable partitions to clamp them in adjusted position.

This hopper is so mounted on a pair of supports 24' here shown as approximately arcuate but which may be of any desirable form. These supports have slots 25 forming nearly a half-circle and thumb-screws 26' are threaded to the hopper and slide in said slots. When the thumb-screws are tightened the hopper is fixed in adjusted position. The adjustment of the hopper is about an arc co-axial with the axis of revolution of a drum 25' whereby the bottom of the hopper is always close to the drum. Said drum has a cylindrical body of perforated sheet metal sufficiently fine to exclude the rice or other grain to be cleaned but permitting the smaller seeds such as watergrass seed and the like to pass through to the interior of the drum. The drum has at one end a ring 26 secured to the inner sprocket in any convenient manner to be driven thereby, the feed roll 18 consequently being driven at a ratio relative to the speed of the drum 25. The feed is thus made to depend on the speed of the cleaning devices but other feed controlling means, which may be arbitrary or may be controlled from the cleaning devices as desired, can be substituted for the means shown.

At the other end of the drum is a ring 27 fitting into a flange 28 on a blower casing 29. The blower casing contains a fan driven by a shaft 30 carrying a fast pulley driven by a belt 31 from a pulley 32 on a shaft connected by a belt 33 and another pulley on the shaft to any convenient source of power.

The casing 29 is connected by a pipe 34 to a cyclone 35 for receiving seeds and other impurities drawn from the drum by the fan and forced through the pipe 34. A seed collector 36 is provided at the lower end of the cyclone from which the material may be removed through a gate 39 at convenient intervals. The cyclone 35 is open at the top for the escape of air only. The seeds and heavier objects descend into the seed collector 36.

Beneath the drum and somewhat to one side of the same is a discharge hopper 38 to receive the cleaned rice and also beneath the drum at the other side thereof is a trough 39 in which is situated a worm conveyor 40 for carrying off material deposited in the trough. An imperforate member 41 of sheet metal or the like is provided adjacent the trough 40 to interrupt the suction over a segment of the cylinder and thus form a dead area to cause the material held on the cylinder to fall off into the worm conveyor.

In the operation of my device, the fan in casing 29 draws air through the drum which rotates in the direction indicated by the arrow in Figure 4, i. e. clockwise. The air slides 13 are adjusted to provide the proper supply of air to maintain a suction, which will hold large and bearded seeds on the outside of the screen until they reach the "dead line" behind the vacuum interrupting member 41 where they will fall off into the trough 40 and be carried away by the worm conveyor 39. The fluted drum 18 feeds the material from the bin 19 down into the hopper 21 which is adjusted as shown by the dotted lines to cause the material to fall into compartment 24 if the rice is very seedy or into the compartments 23 or 22 according to the seediness of the rice. The reason for this is evident in that if the rice is fed into the discharge compartment 22 as shown in the drawing it will be kept in contact with the drum for only a short time whereas if fed into the compartment 24 it will be held against the drum for a much longer time to permit the watergrass seed and other like seeds to escape through the screen into the drum.

The partitions between the compartments are adjusted radially toward or from the drum thus affording greater or less clearance for passage of clean rice underneath the slides and to one side of the drum as shown in Figure 4. This capacity for adjustment is especially desirable when the hopper is in the dotted line position or in the intermediate position. When in the full line position the clean rice slips under the left side of the hopper, the watergrass seed passes through the holes in the sheet metal screen and the beards etc. pass under the wall of the screen at the right-hand side, such travel being against the action of gravity by which the clean rice is caused to slide over the drum toward the hopper or chute 38. The slides at the sides are adjustable respectively to provide a variable outlet for the cleaned rice and for the refuse comprising beardy heads etc. to be fed into the trough 39. When the hopper is in the dotted line position or in the intermediate position the grain being cleaned will run underneath the first partition to the left of the feed roller 18 in Figure 4 and pile up more or less in the next compartment. It will now be acted on by the drum etc. to remove additional foreign seeds and if the hopper is in extreme position will slip under the second partition and again be held for action by the drum until finally it slips out beneath the slide at the extreme left of the hopper and falls into the hopper 38. The rate of flow of grain from one compartment to another and to the outlet is regulated by adjustment of the slides 22' and the outflow of excessively large seeds and heads is regulated by adjustment of the slide at the right-hand side of the hopper.

As the drum now rotates the clean rice falls off into the hopper 38 and the beardy rice and other material into the trough 40 as explained above while the seeds that pass through the screen are drawn off into the pipe 34 by the air blast. By my invention it will be seen that there need be no waste, the clean rice passing into the discharge hopper 38, the beardy rice and other large waste being carried off by the conveyor 40 in such a manner that they can be collected and utilized, and the small seeds passing into the seed collector 36 from which they may be removed and put to such use as they may be fit for.

While I have described the machine as a cleaner for rice the principle is such as to make it applicable to other seeds and grains having similar characteristics, and the use of the term "rice" and certain other specific terms in the specification and claims is for purposes of definition and not for unnecessary limitation; it being my intention to adapt the machine to the cleaning or screening of every kind of grain, as well as for use with any other granular materials to which it may be suited.

It will be evident to those skilled in the art that various changes may be made in the construction and arrangement of my device without departing from the scope of the invention and therefore I do not limit myself to the specific means shown in the drawings and described in the specification, but only as indicated in the appended claims.

Having thus fully described my said invention, what I claim as new and desire to secure by Letters Patent, is:

1. In a seed separator, a rotary screen, feeding means above the same, means for drawing air through the holes of the screen, means at one side of the screen for receiving seed from the same, and means spaced therefrom to cut off the suction over a portion of the screen for discharging relatively large and light objects from the screen, substantially as set forth.

2. In a seed separator, a rotary screen, feeding means above the same, means for drawing air through the holes of the screen, means at one side of the screen for receiving cleaned seed from the same, means spaced therefrom to cut off the suction over a portion of the screen for discharging relatively large and light objects from the screen, and means adjacent to such discharging means for carrying off the material discharged, substantially as set forth.

3. In a rice separator, a traveling screen, a bin above the screen, means for discharging rice from the bin, a tilting hopper having partitions providing compartments extending lengthwise of the screen whereby the duration of contact of the rice with the screen may be varied, feeding means fixed in position so as to feed to different compartments according to the adjustment of the hopper and means to remove the small seeds from the interior of the screen, substantially as set forth.

4. In a rice separator, a rotary screen, a bin above the screen, means for discharging rice from the bin, a tilting hopper having partitions extending lengthwise of the screen whereby the duration of contact of the rice with the screen may be varied, means to receive the cleaned rice, and independent means to remove foreign matter separated therefrom, substantially as set forth.

5. In a seed separator, a rotary screen having holes larger than the seeds to be taken out, means for depositing grain on the surface of the screen said screen being open at one end, a fan casing having an opening enclosing the open end of the screen, means for driving the fan, means at the other end of the screen for admitting air in variable amounts to the interior of the screen, and means for receiving cleaned grain from the exterior of the screen, substantially as set forth.

6. In a seed separator, a rotary screen having holes larger than the seeds to be taken out, means for depositing grain on the surface of the screen said screen being open at one end, a fan casing having an opening enclosing the open end of the screen, means for driving the fan, means at the other end of the screen for admitting air in variable amounts to the interior of the screen, means for receiving cleaned grain from the exterior of the screen, and means within the screen for cutting off the suction from a segment of the same to discharge material held against the outer surface of the screen, substantially as set forth.

7. In a seed separator, a rotary screen having holes larger than the seeds to be removed, means for depositing seeds on the surface of the screen said screen being open at one end, a fan casing having an opening enclosing the open end of the screen, means for driving the fan, means at the other end of the screen for admitting air in variable amounts to the interior of the screen, means for receiving cleaned seeds from the exterior of the screen, means within the screen for cutting off the suction from a segment of the same to discharge material held against the upper surface of the screen, and a conveyor adjacent to such means adapted to receive the matter so discharged, substantially as set forth.

8. In a separator for cleaning rice and the like, a movable apertured device, a hopper above said device divided into compartments said hopper being movable relatively to said device to vary the duration of contact of the grain to be cleaned with said device, and means for feeding the grain into different compartments according to the position of the hopper substantially as set forth.

9. In a separator for cleaning rice and the like, a movable apertured device, a hopper above said device divided into compartments said hopper being movable relatively to said device to vary the duration of contact of the grain to be cleaned with said device, and means for feeding the grain into different compartments according to the position of the hopper the partitions between said compartments being radially adjustable to vary the spaces between the partitions and the said device, substantially as set forth.

10. In an apparatus for cleaning rice and other grains, a rotary drum having apertures in its periphery, a hopper pivoted to move about the axis of the drum said hopper having compartments opening at the bottom adjacent the periphery of the drum, and means fixed above the hopper for feeding material into different compartments thereof according to the position of adjustment of the hopper, substantially as set forth.

11. In an apparatus for cleaning rice and other grains, a rotary drum having apertures in its periphery, a hopper pivoted to move about the axis of the drum said hopper having compartments opening at the bottom adjacent the periphery of the drum, and means fixed above the hopper for feeding material into different compartments thereof according to the position of adjustment of the hopper the walls between the compartments of the hopper having openings therein and vertically slidably closures for varying the effective height of said walls, substantially as set forth.

12. In a separator for paddy rice and the like, a drum of perforated sheet metal, means for feeding rice thereto to run down one side of the drum, means to turn the drum in a direction contrary to the flow of rice, and means to vary the duration of contact of the rice with the drum, substantially as set forth.

13. A seed separator having a rotating screen, feeding means above the screen, suction means operating on the interior of the screen to withdraw seeds of small size such means also serving to hold light and bulky objects on the screen, means for collecting the grain that runs off the screen, and means at another point for removing and collecting said light and bulky objects, substantially as set forth.

14. In a seed separator, a perforated rotary screen, a bin above the screen, means for discharging seed from the bin, a hopper arranged to tilt about the axis of the screen, partitions in the hopper extending parallel to said axis and pneumatic means for drawing impurities through the perforations of the screen and thereafter removing them from the interior of the screen, substantially as set forth.

15. A seed separator comprising a screen, means for feeding thereto a mixture comprising small seeds, refuse and grain larger than the meshes of the screen, means to receive the cleaned grain, pneumatic means for drawing the small seeds through the screen said means serving also to hold light and bulky refuse in place thereon, and means independent of the grain-receiving means for receiving such refuse, substantially as set forth.

16. A separator for heavy larger particles, light larger particles and smaller particles comprising a screen, feeding means therefor, suction means to draw the smaller particles through the screen said means serving also to hold light larger particles on the screen, means for collecting the heavy larger particles, and means at a distance therefrom to discharge the light larger particles separately from said heavy larger particles, substantially as set forth.

In witness whereof, I have hereunto set my hand and seal at San Francisco, California, this 4th day of June, A. D. nineteen hundred and twenty-three.

ANTON SCHOENEGG. [L. S.]

Witnesses:
A. WM. BAUMGARTEN,
WALTER WECK.